(12) United States Patent
Durney

(10) Patent No.: US 9,403,285 B2
(45) Date of Patent: Aug. 2, 2016

(54) POCKET-CUTTING/SCREW-INSERTION SYSTEM WITH IMPROVED SCREW DELIVERY

(71) Applicant: Max Durney, Petaluma, CA (US)

(72) Inventor: Max Durney, Petaluma, CA (US)

(*) Notice: Subject to any disclaimer, the term of this patent is extended or adjusted under 35 U.S.C. 154(b) by 119 days.

(21) Appl. No.: 14/214,092

(22) Filed: Mar. 14, 2014

(65) Prior Publication Data

US 2014/0259632 A1    Sep. 18, 2014

Related U.S. Application Data

(60) Provisional application No. 61/799,302, filed on Mar. 15, 2013.

(51) Int. Cl.
| | |
|---|---|
| B27M 1/08 | (2006.01) |
| B27C 9/00 | (2006.01) |
| B27M 3/00 | (2006.01) |
| B23P 23/04 | (2006.01) |
| F16B 5/02 | (2006.01) |

(52) U.S. Cl.
CPC .. B27M 1/08 (2013.01); B27C 9/00 (2013.01); B27M 3/0073 (2013.01); *B23P 23/04* (2013.01); *F16B 5/0291* (2013.01); *Y10T 29/49* (2015.01); *Y10T 29/52* (2015.01)

(58) Field of Classification Search
CPC ........ B27M 1/08; B27M 3/0073; B27M 3/18; B27M 3/28; B27C 9/00; B27C 3/06; B27C 3/04; B27C 9/04; B27C 9/02; Y10T 29/52; Y10T 29/49; Y10T 29/49623; Y10T 29/49629; Y10T 29/49963; Y10T 29/49995; Y10T 29/49998; Y10T 29/49996
See application file for complete search history.

(56) References Cited

U.S. PATENT DOCUMENTS

| | | | | |
|---|---|---|---|---|
| 3,496,974 | A * | 2/1970 | Silvey | F16B 12/46 144/353 |
| 3,664,011 | A * | 5/1972 | Labastrou | B27F 1/00 144/347 |
| 4,603,719 | A | 8/1986 | Durney | |
| 4,909,012 | A * | 3/1990 | Thompson, Jr. | E04B 2/702 267/33 |
| 4,944,627 | A | 7/1990 | Durney | |
| 5,063,982 | A | 11/1991 | Durney | |
| 5,375,636 | A * | 12/1994 | Bosten | B23Q 9/0092 144/136.1 |
| 5,553,645 | A | 9/1996 | Durney | |
| 5,769,574 | A | 6/1998 | Feinsod | |
| 6,599,064 | B1 * | 7/2003 | Robinson | B23B 47/288 408/110 |
| 6,877,536 | B2 | 4/2005 | Durney | |

(Continued)

*Primary Examiner* — Jason L Vaughan
(74) *Attorney, Agent, or Firm* — Santa Fe IP, LLC

(57) ABSTRACT

A pocket-cutting/screw-insertion system is configured for cutting screw pockets in a work piece and inserting screws therein. The system includes a clamp assembly, a router assembly, a drill assembly, and a delivery/insertion assembly including a screw delivery tube for delivering a screw, a stop block for arresting forward motion of the screw, an insertion rod for pushing the screw into the screw pocket and screw bore, and a screw channel for supporting the screw as it is inserted into the screw pocket and screw bore, wherein the stop block is positioned above the insertion rod and the screw channel such the screw first falls from the stop block onto the insertion rod once the stop block arrests forward motion of the screw and then falls from the insertion rod onto the screw channel. A method of using the system is also disclosed.

14 Claims, 10 Drawing Sheets

(56) References Cited

U.S. PATENT DOCUMENTS

| | | | |
|---|---|---|---|
| 7,165,300 B2 * | 1/2007 | Phillips | B23B 47/287 144/3.1 |
| 7,374,373 B1 * | 5/2008 | Park | B23B 39/003 408/103 |
| 7,641,424 B1 * | 1/2010 | Sommerfeld | B23B 47/287 408/103 |
| 7,967,534 B2 * | 6/2011 | McDaniel | B23B 47/287 408/103 |
| 7,976,252 B2 * | 7/2011 | McDaniel | B23B 47/287 408/103 |
| 8,046,891 B1 * | 11/2011 | Zelazoski | B27G 1/00 29/412 |
| 8,087,853 B2 * | 1/2012 | Stukuls | B23B 39/161 408/115 R |
| 8,430,141 B2 * | 4/2013 | Garnett | B23B 47/287 144/134.1 |
| 2004/0146374 A1 | 7/2004 | Durney | |
| 2005/0263214 A1 | 12/2005 | Durney | |

* cited by examiner

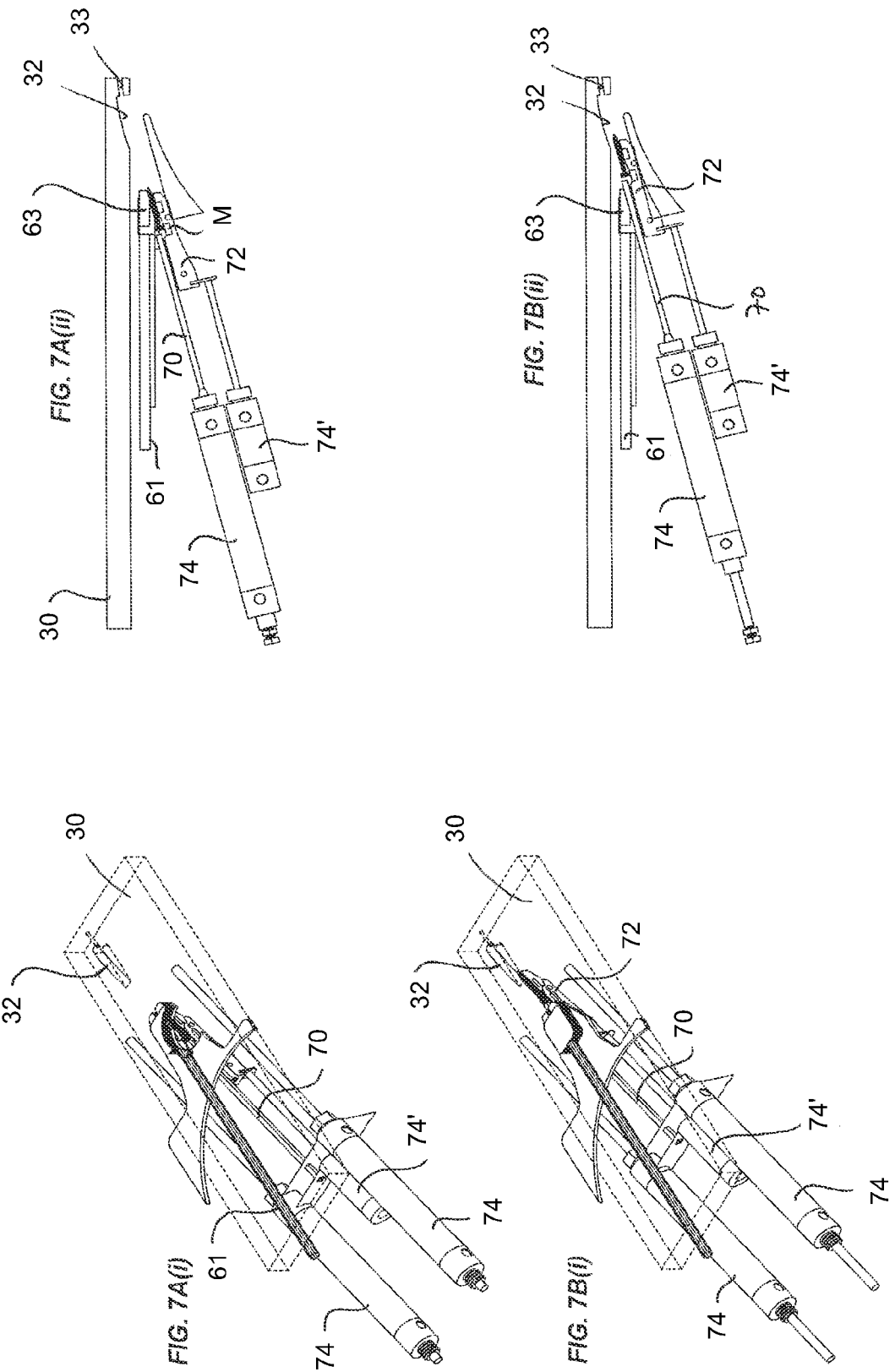

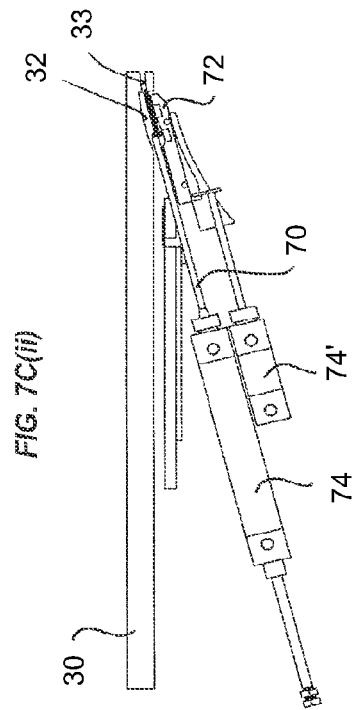
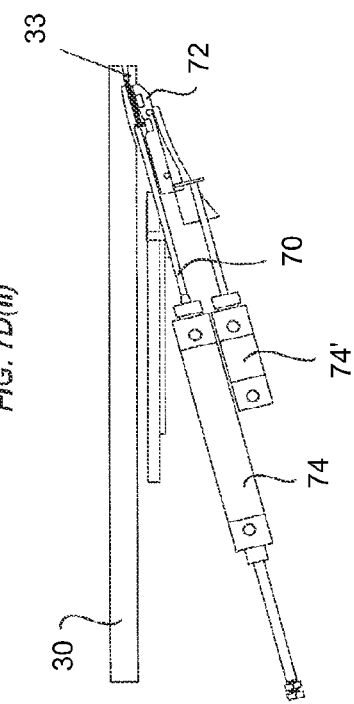
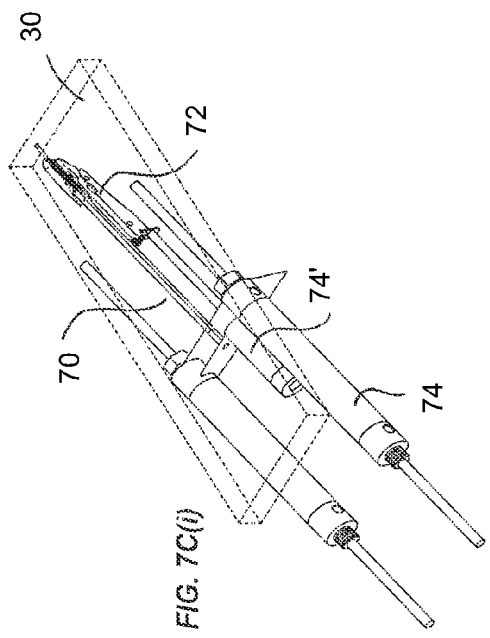
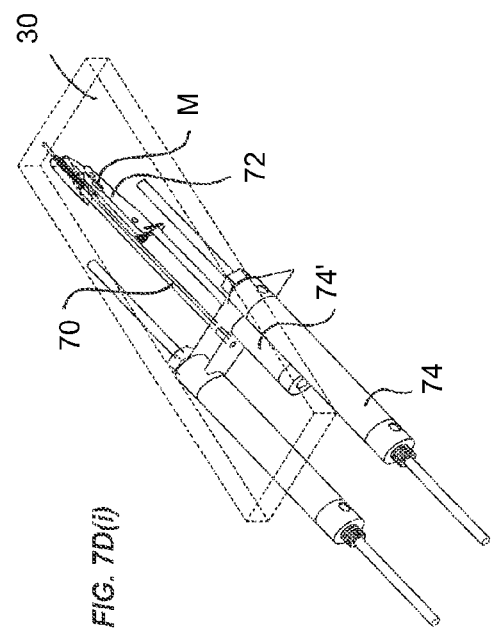

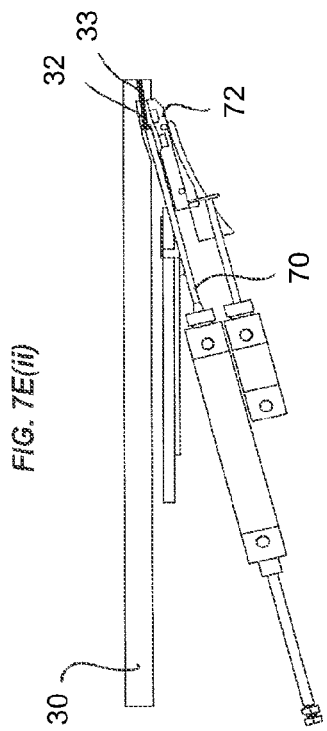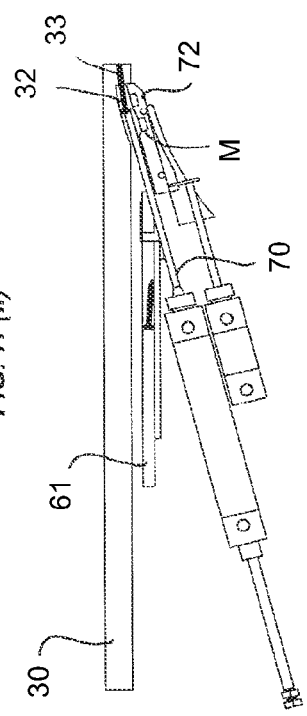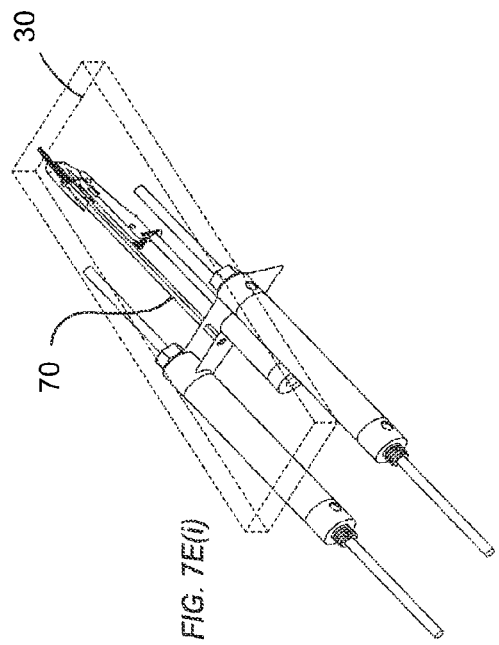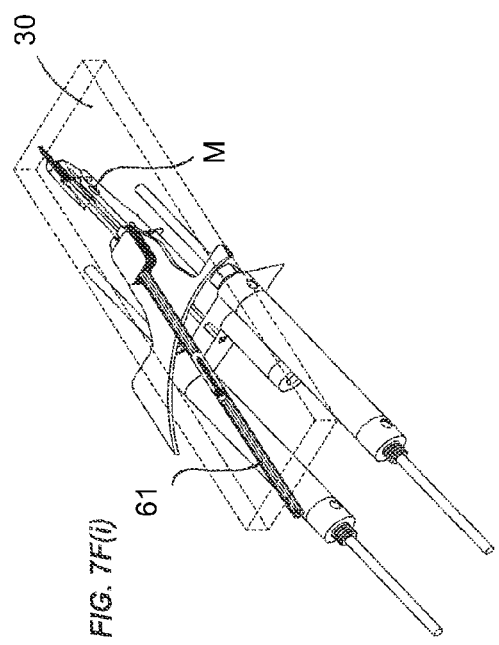

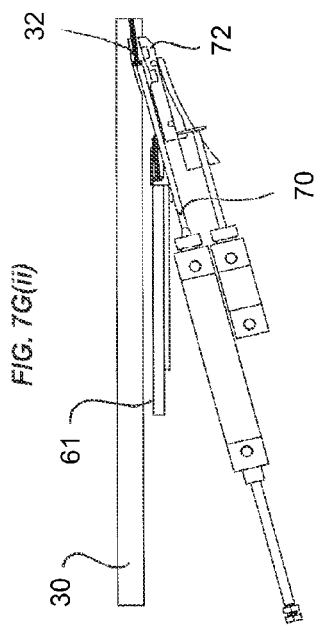
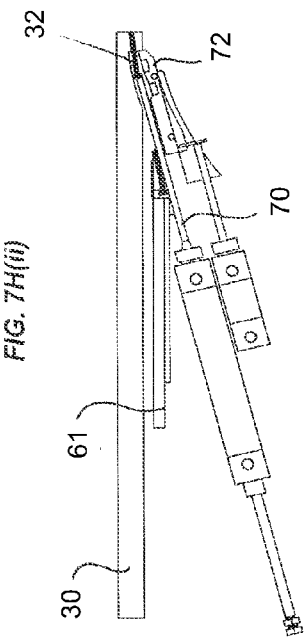
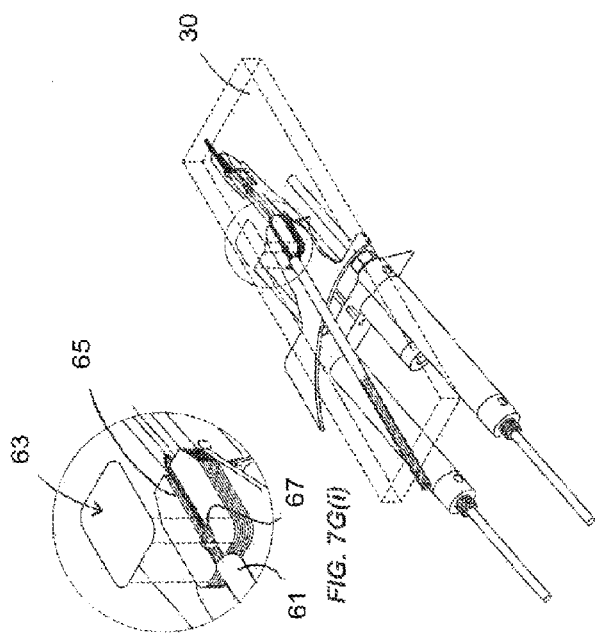
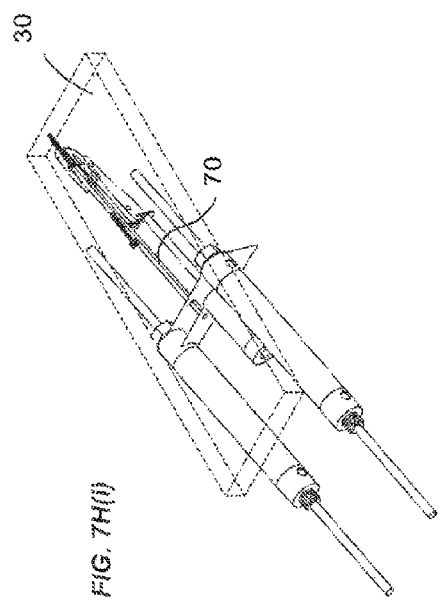

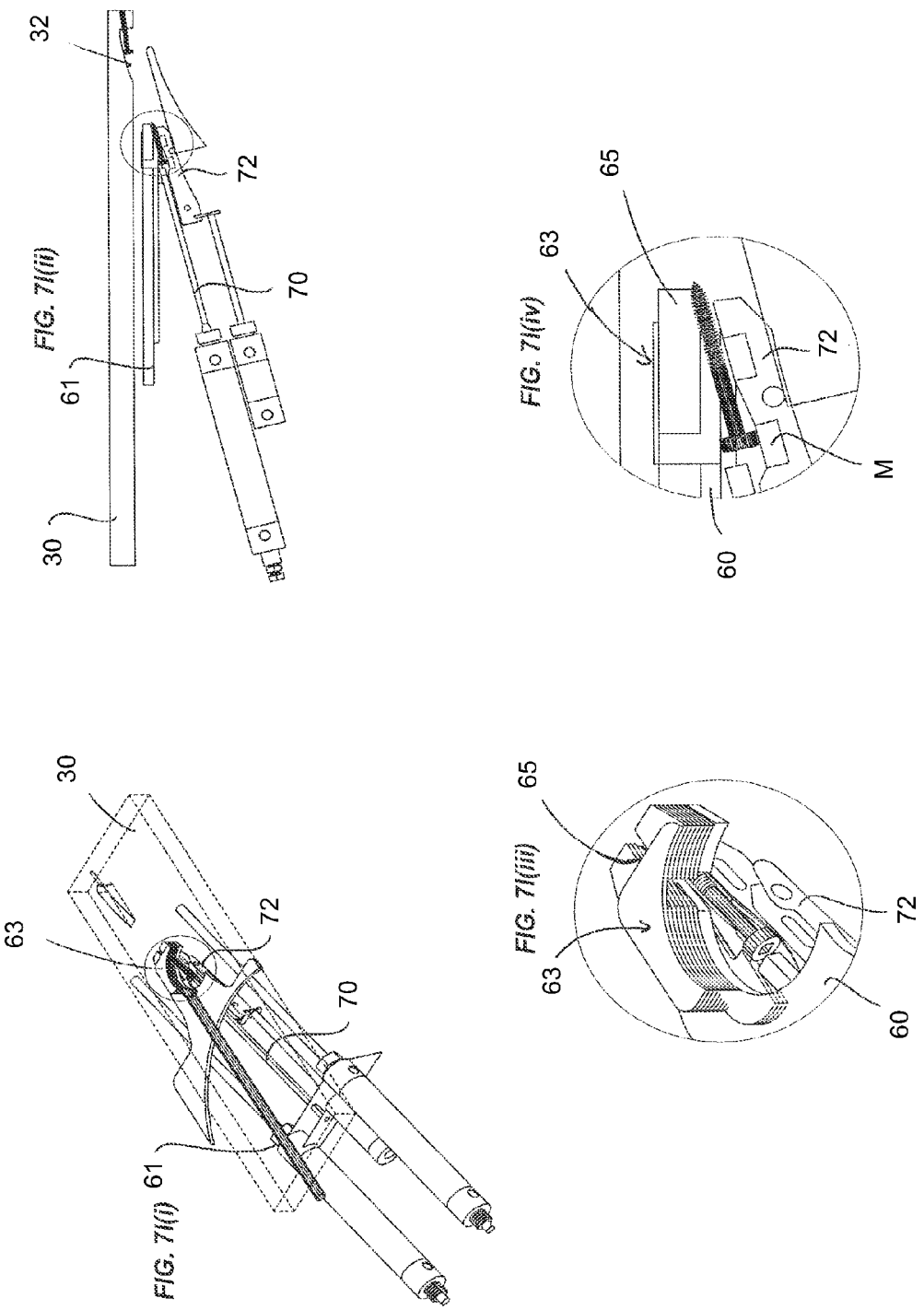

POCKET-CUTTING/SCREW-INSERTION SYSTEM WITH IMPROVED SCREW DELIVERY

CROSS REFERENCE TO RELATED APPLICATIONS

This application claims the benefit under 35 U.S.C. §119(e) to U.S. Application No. 61/799,302 filed Mar. 15, 2013, the disclosure of which is incorporated by reference in its entirety.

BACKGROUND OF INVENTION

1. Field of Invention

This application relates, in general, to a pocket-cutting/screw-insertion system and more particularly to a system including an improved delivery/insert assembly and methods for their use.

2. Description of Related Art

Many commercially manufactured cabinet and furniture products are formed from a plurality of wooden, composite or plastic members which are joined together by a plurality of fasteners, most usually wood screws. In many instances, the wood screws are positioned in screw pockets or mortises formed in the joinery member adjacent to an edge of the member, which edge is then secured to a second joinery member. For example, and with reference to FIG. 1, a joinery member 30 may be provided with screw pockets 32 with corresponding screw bores 33 which are dimensioned to receive wood screws 35 therein in such a manner that the joinery member may be screwed and secured to an abutting second joinery member by the wood screws.

The formation of screw pockets can be accomplished using various types of equipment. Some of the most efficient ways of forming screw pockets and complementary bores are set forth in my prior U.S. Pat. Nos. 6,877,536, 5,063,982 and 4,603,719.

If the number of members to be joined together is relatively small, the apparatus of my '982 and '719 patents is quite suitable for allowing a woodworker to manually place fasteners or pocket screws into pockets. In the do-it-yourself or low volume contexts, it is relatively easy and not too time consuming to simply manually position the pocket screws for screwing into the other joinery member using a powered or unpowered screwdriver.

In high volume production situations, however, fabrication lines need to be partially or fully automated, and one of the more difficult and time consuming tasks in a joinery production line is to automate the positioning of fasteners in the joinery members so that they can be fastened together using a power screwdriver. It is undesirable in high volume production applications, therefore, to form the screw pocket and bore automatically and yet have to employ manual labor to insert fasteners in the bores for subsequent powered screwing together of the joinery pieces. My '536 patent addresses such problems by enhancing placement of the pocket screws in joinery members in a production line for subsequent formation of joinery assemblies.

Nonetheless, it would be beneficial to have methods and apparatuses which more precisely, consistently and reliably deliver a screw to the screw pocket in such a manner to allow for higher throughput.

BRIEF SUMMARY

One aspect of the present invention is directed to a pocket-cutting/screw-insertion system for cutting screw pockets in a work piece and inserting screws therein.

The system may include a clamp assembly for securing a work piece to a work top, a router assembly arranged to rout a screw pocket in the work piece, a drill assembly arranged to drill a screw bore extending from an edge of the work piece to the screw pocket, and a delivery/insertion assembly including a screw delivery tube for delivering a screw from a screw supply, a stop block for arresting forward motion of the screw from the screw delivery tube, an insertion rod for pushing the screw into the screw pocket and screw bore, and a screw channel for supporting the screw as it is inserted into the screw pocket and screw bore, wherein the stop block is positioned above the insertion rod and the screw channel such the screw first falls from the stop block onto the insertion rod once the stop block arrests forward motion of the screw and then falls from the insertion rod onto the screw channel.

The screw delivery tube may extend substantially horizontally.

The stop block may include a longitudinal slot dimensioned and configured to loosely receive the screw and a shoulder dimensioned and configured to contact against a head of the screw to arrest forward motion of the screw within the stop block.

The delivery/insertion assembly may further include a removable screw tube plate supporting the screw tube and the stop block, wherein the stop block is formed of laminations mounted on a screw tube plate.

The stop block may further include under laminations positioned on a bottom surface of the screw tube plate.

The delivery/insertion assembly may further include a first actuator to reciprocate the insertion rod between retracted and extended positions, and a second actuator to reciprocate the screw channel between retracted and extended positions.

The first and second actuators may be pneumatic actuators.

The system may be configured so that first actuator retracts the insertion rod before the second actuator retracts the screw channel thereby allowing the delivered screw to fall from the insertion rod onto the screw channel.

Another aspect of the present invention is directed to a pocket-cutting/screw-insertion method for cutting screw pockets in a work piece and inserting screws therein, the method includes securing a work piece to a work top, routing a screw pocket in the work piece, drilling a screw bore extending from an edge of the work piece to the screw pocket, delivering a screw from a screw supply to a delivery/insertion assembly, wherein forward motion of the screw is arrested by a stop block mounted on the delivery/insertion assembly and the screw is allowed to fall from the stop block onto an insertion rod, and wherein the insertion rod retracts thereby allowing the screw to fall from the insertion rod onto a screw channel, and inserting the screw into the screw pocket such that a tip of the screw extends into the screw bore, wherein the insertion rod pushes the screw into the screw pocket as the a screw channel supports the screw.

The forward motion of the screw may be substantially horizontal motion.

The stop block may include a longitudinal slot dimensioned and configured to loosely receive the screw and a shoulder dimensioned and configured to contact against a head of the screw to arrest forward motion of the screw within the stop block.

A first actuator may reciprocate the insertion rod between retracted and extended positions and a second actuator reciprocate the screw channel between retracted and extended positions.

The first and second actuators may be pneumatically actuated.

The first actuator may retract the insertion rod before the second actuator retracts the screw channel thereby allowing the screw to fall from the insertion rod onto the screw channel prior to insertion.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A(i) and FIG. 7A(ii) are respective schematic isometric and cross-sectional representations of the delivery/insert assembly of FIG. 5, as shown at a cycle start position.

FIG. 7B(i) and FIG. 7B(ii) are respective schematic isometric and cross-sectional representations of the delivery/insert assembly of FIG. 5, as shown with a screw advancing toward a screw pocket.

FIG. 7C(i) and FIG. 7C(ii) are respective schematic isometric and cross-sectional representations of the delivery/insert assembly of FIG. 5, as shown with the screw tip entering a counter bore.

FIG. 7D(i) and FIG. 7D(ii) are respective schematic isometric and cross-sectional representations of the delivery/insert assembly of FIG. 5, as shown with a screw channel contacting a screw-pocket wall.

FIG. 7E(i) and FIG. 7E(ii) are respective schematic isometric and cross-sectional representations of the delivery/insert assembly of FIG. 5, as shown with a screw fully inserted.

FIG. 7F(i) and FIG. 7F(ii) are respective schematic isometric and cross-sectional representations of the delivery/insert assembly of FIG. 5, as shown with a subsequent screw being delivered for subsequent insertion.

FIG. 7G(i) and FIG. 7G(ii) are respective schematic isometric and cross-sectional representations of the delivery/insert assembly of FIG. 5, as shown with the subsequent screw being stopped by a stop block.

FIG. 7H(i) and FIG. 7H(ii) are respective schematic isometric and cross-sectional representations of the delivery/insert assembly of FIG. 5, as shown with the subsequent screw dropping onto an inserter rod.

FIG. 7I(i) and FIG. 7I(ii) are respective schematic isometric and cross-sectional representations of the delivery/insert assembly of FIG. 5, as shown at a cycle end position.

FIG. 7I(iii) and FIG. 7I(iv) are enlarged detail views of FIG. 7I(i) and FIG. 7I(ii).

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Systems in accordance with the present invention are particularly well suited for partial or fully automated joinery applications such as the production of components or subassemblies used to form cabinetry or furniture. As used herein, the expression "joinery member" and "work piece" shall include wooden members, composite resin and bonded cellulose-based and/or plastic members, plastic members, and combinations of wood and plastic members. It is possible that the present system could be applied to metal members, particularly metals which are easily machined such as aluminum, but generally the present system is best adapted for use with materials typically employed in a production woodworking facility to form products such as cabinetry and furniture.

The term "screw pocket" generally refers to a depression routed into the joinery member to allow for "toe screw mortise" joinery.

In addition, although the term "wood screw" is used throughout, one will appreciate that other suitable fasteners may be used in conjunction with the systems of the present invention. For example, threaded fasteners such as carriage bolts, hex bolts, lag screws, machine screws, sheet metal screws, socket screws and the like may be utilized with the systems of the present invention, as well as non-threaded fasteners such as keys, pins, rivets and other elongated fasteners that may be received within a screw pocket and screw bore.

Moreover, the system is particularly well suited for high production runs in which manual steps are partially or fully automated so that a continuous production line can be established.

Figures 1, 2:
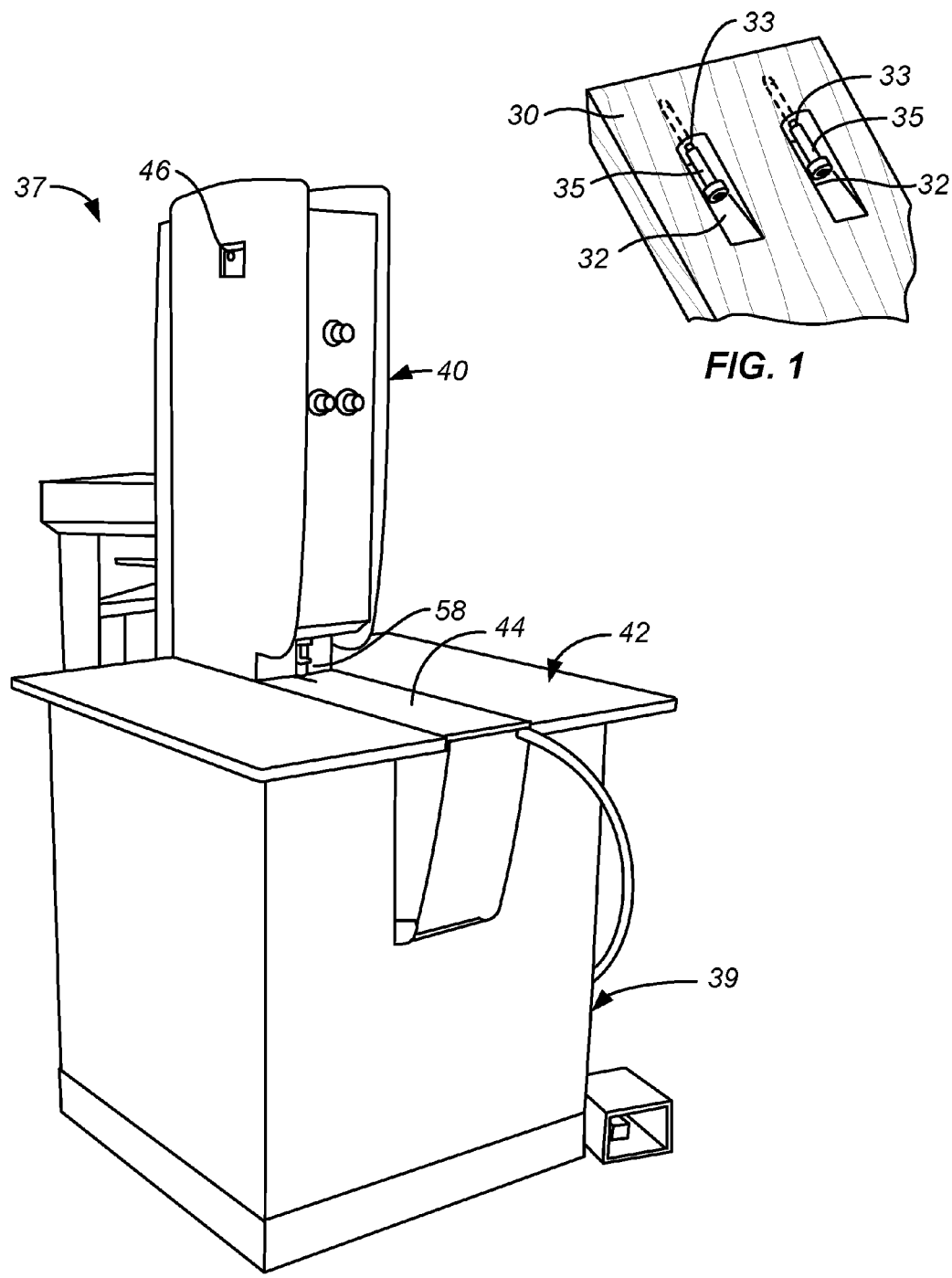
FIG. 1 is a perspective view of an exemplary joinery member including a pair of screw pockets with fasteners positioned therein.
FIG. 2 is a perspective front view of an exemplary pocket-cutting/screw-insertion system in accordance with the present invention

Turning now to the drawings, wherein like components are designated by like reference numerals throughout the various figures, attention is directed to FIG. 2 which shows an exemplary pocket-cutting/screw-insertion system, generally designated by the numeral 37. In various aspects, the systems of the present invention are similar to those disclosed by U.S. Pat. Nos. 6,877,536, 5,063,982, 4,944,627, and 4,603,719, the entire content of which patents is incorporated herein for all purposes by this reference.

The systems of the present invention may include various features presently found in the CSI-Next machine manufactured and sold by Castle, Inc. of Petaluma, California. For example, the systems of the present invention may include low angle pocket cutting, Screw-in-Pocket (SIC) technology, undersized pilot holes for screw retention, pockets receiving inserted screws "below-flush" within the pockets to prevent marring of adjacent joinery members when stacked, easy access for quick tooling changes and serviceability, and "Flip Stop" indexing systems to provide a desired gap between the screw pocket and the joinery member edge.

With reference to FIG. 2, the pocket-cutting/screw-insertion system generally includes a lower base assembly 39 and an upper case assembly 40. The base assembly supports a work top 42 having a removable work deck 44. The case assembly generally includes an operator programmable logic controller (PLC) unit 46 and other operator controls. The PLC unit may be a digital computer or other suitable means that receives signals from various machine sensors, actuators, motors and cylinders in order to properly control the machine actuators, motors and cylinders.

With continued reference to FIG. 2, the case assembly generally houses a router assembly 47, a drill assembly 49, and a screw delivery/insert assembly 51, all of which are controlled by the PLC unit. In the illustrated embodiment, the router, drill and delivery/insert assemblies are mounted on tool carriages which are removable structures allow for these assemblies to be easily removed as subassemblies from the case assembly. One will appreciate that other suitable mounting structure may be utilized to removably and/or accessibly mount the router, drill and delivery/insert assemblies within the system.

Figure 3:
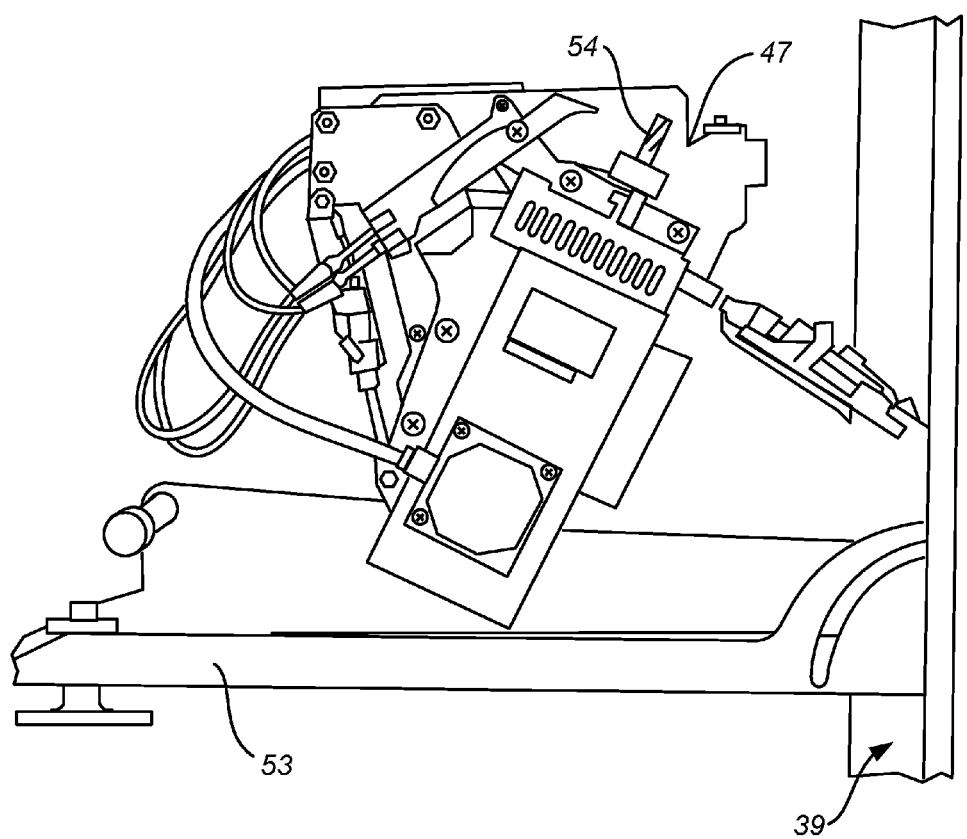
FIG. 3 is a perspective side view of a router assembly of the system of FIG. 2, the router assembly shown in an accessible maintenance position.

As shown in FIG. 3, case assembly 39 includes a rear door 53 which may be opened to access and remove router assembly 47 to a maintenance position in which it rests upon the rear door. Generally, the router assembly is configured to pivot back and forth such that router bit 54 sweeps in the direction of arcuate arrow R to form the screw pocket in an otherwise conventional manner.

Figure 4:
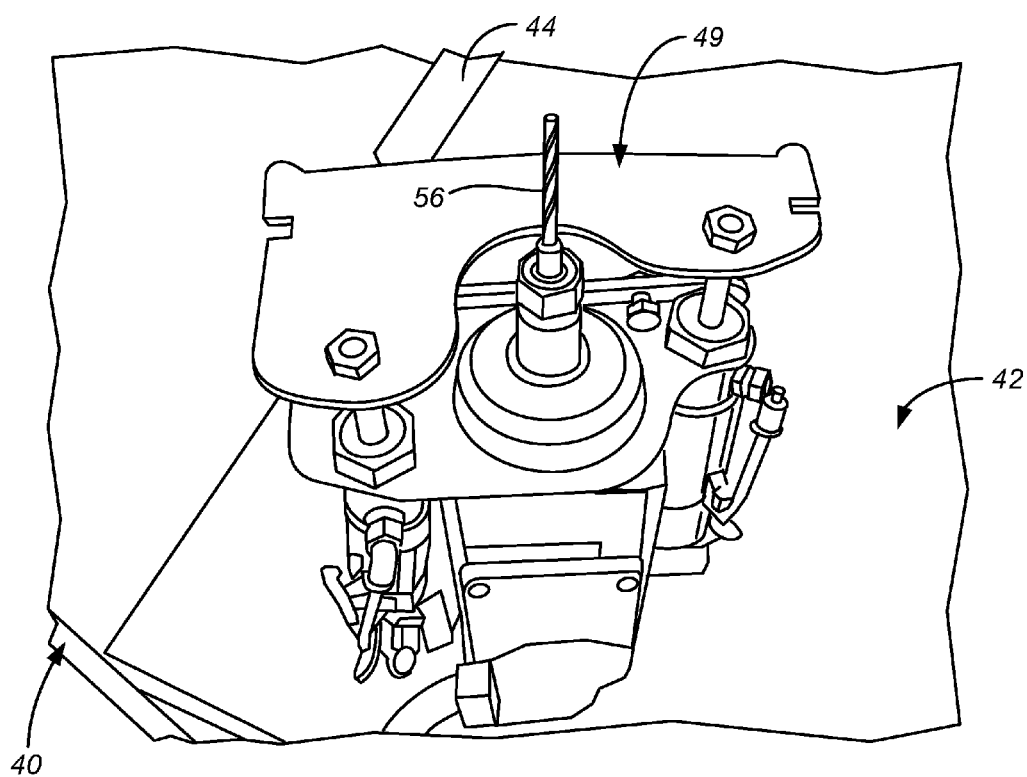
FIG. 4 is a perspective top view of a drill assembly of the system of FIG. 2, the drill assembly as shown removed and placed on a work top for maintenance.

The rear door also provides access to drill assembly 49, which may be removed prior to the router assembly and, as shown in FIG. 4, placed on work top 42 for maintenance and repair. The drill assembly includes a drill bit 56 and reciprocates back and forth in the longitudinal direction of the drill bit to form the screw bore in an otherwise conventional manner.

In operation, and with reference to FIG. 2, a joinery member may be positioned (face down) on the work deck such that a clamp assembly including a clamp foot 58 temporarily secures the joinery member upon the work top. Router assembly 47 may than pivot back and forth such that router bit 54 forms a screw pocket. Drill assembly 49 may than reciprocate back and forth such that drill bit 56 forms a corresponding screw bore. And delivery/insert assembly 51 than delivers a wood screw to the screw pocket and partially inserts it into the screw bore in accordance with the present invention.

Figure 5:
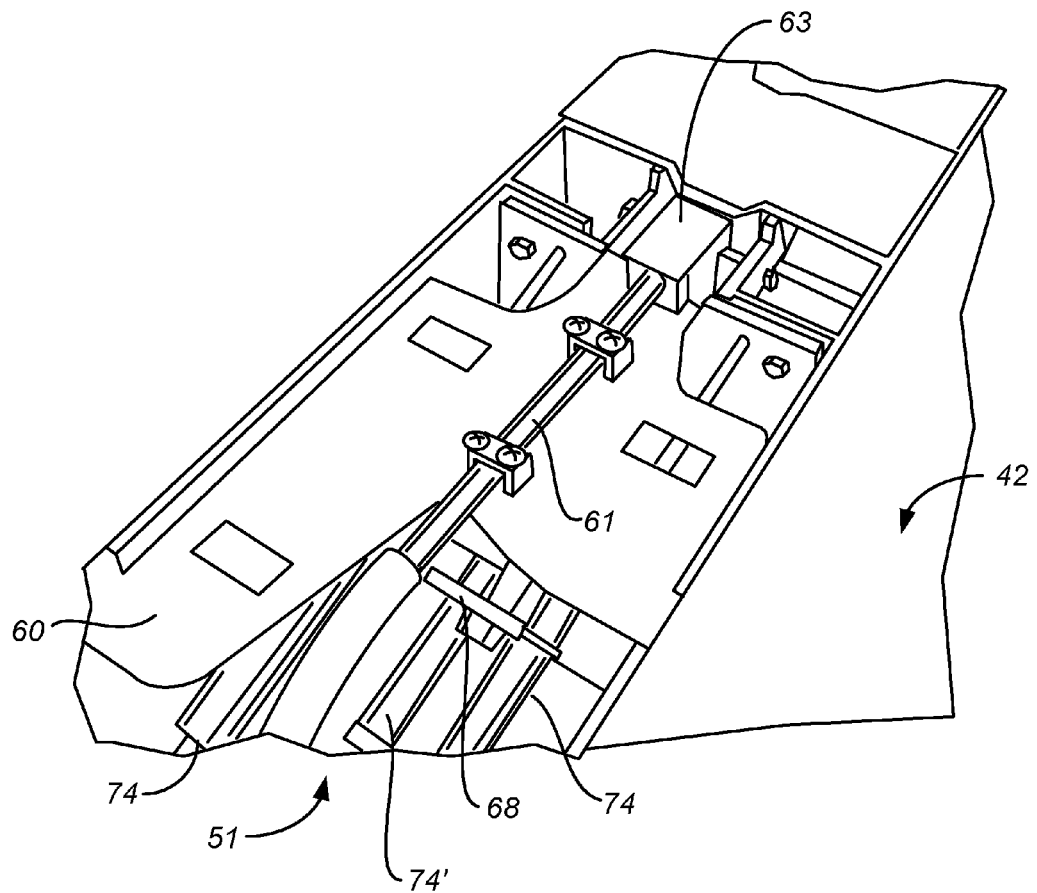
FIG. 5 is a perspective top view of a delivery/insert assembly of the system of FIG. 2, the delivery/insert assembly as shown with a work deck removed for access to the delivery/insert assembly for maintenance.

Turning now to FIG. 5, the work deck may be removed from work top 42 in order to access delivery/insert assembly 51. As shown in FIG. 5, the delivery/insert assembly includes a screw tube plate 60 including a screw tube 61 that is operably connected with a wood screw supply. For example, the screw tube may be operably connected with a vibratory screw feeding system of the type provided by Weber Screwdriving Systems Inc. of Yorktown Heights, N.Y. One will appreciate that the screw tube may be operably connected with other suitable wood screw supply devices. In the illustrated embodiment, the screw tube terminates in a stainless tube that is interconnected with the wood screw supply by a length plastic tubing. One will appreciate that the screw tube may take various forms including an all metal configuration, an all plastic configuration, other material configurations, or combinations thereof.

The screw tube plate also includes a stop block 63 which serves to position and stage the delivered screws for subsequent insertion, as will be discussed in greater detail below. In the illustrated embodiment, the stop block is formed of laminations mounted on screw tube plate 60 which include a central slot 65 having shoulders 67 to arrest forward motion of a delivered screw at a precise position. In the illustrated embodiment, the forward motion of the delivered screw is substantially horizontal, however, one will appreciate that the screw may move at inclined angles provided that the screw may fall freely free once forward motion stops. In various embodiments, the laminations may be formed on The laminations may be formed of hardened spring steel or other suitable materials that facilitate a assembly while providing significant wear resistance. In various embodiments, the stop block may also include under laminations positioned below the screw tube plate (see, e.g., FIGS. 7I(iii) and 7I(iv)) in order to enhanced the guiding action of the central slot as will become apparent below.

Figure 6:
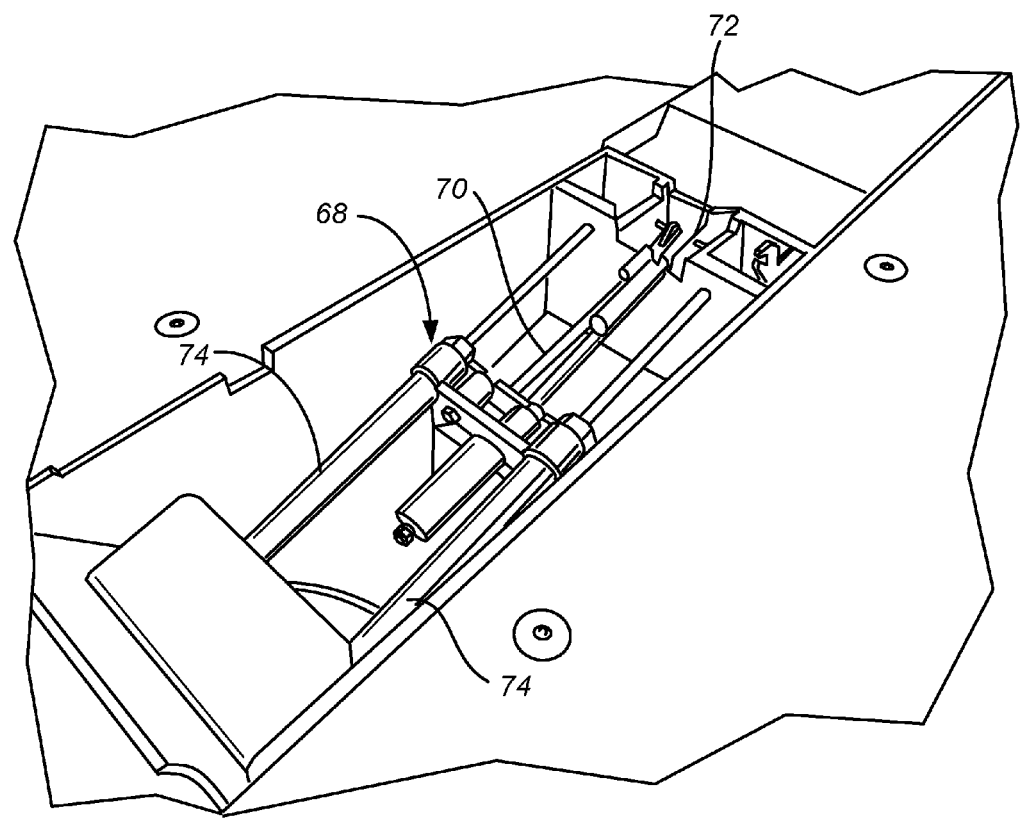
FIG. 6 is another perspective top view of the delivery/insert assembly of FIG. 5, as shown with the work deck and a screw delivery assembly removed for access to the insert assembly for maintenance.

Turning now to FIG. 6, screw tube plate 60 may be removed in order to provide access to an inserter carriage 68 for maintenance and repair. The inserter carriage is configured to move the wood screw into the screw pocket and press the wood screw into the screw bore. Generally and with reference to FIG. 7 et seq, the inserter carriage includes an insertion rod 70 and a screw channel 72 which reciprocate back and forth between retracted and extended positions. The screw channel is dimensioned and configured to receive the delivered screw as it falls from stop block 63, and in various embodiments, the screw channel is magnetized to enhance positioning and retention of the delivered screw upon the screw channel. One will appreciate that the screw channel itself may be magnetized, or may be provided with one or more magnets M.

Linear actuators 74, 74' are provided to move insertion rod 70 and screw channel 72, respectively, and as will become apparent below, insertion rod 70 and screw channel may move in unison with, or independently of each other. In the illustrated embodiment, the linear actuators are pneumatic actuators, however, one will appreciate that other suitable actuators may be utilized.

The operation of the delivery/insert assembly may now be described. Generally, pocket-cutting/screw-insertion system 51 of the present invention operates through a "pocket cycle" in which clamp foot 58 clamps a joinery member upon work deck 44, router assembly 47 routs the screw pocket, drill assembly 49 drills the pilot hole or screw bore, delivery/insertion assembly 51 inserts the wood screw into the screw bore, and clamp foot releases the joinery member.

Turning now to FIG. 7A(i) and FIG. 7A(ii), the delivery/insertion subcycle of the pocket cycle commences following the routing and drilling processes. Specifically, the subcycle starts with insertion rod 70 and screw channel 72 in fully retracted positions. At this position with the insertion rod out of the way, a delivered screw simply falls down from slot 65 within stop block 63 and onto screw channel 72. In the illustrated embodiment, the delivered screw falls substantially unassisted, that is, mainly under the force of gravity. However, in accordance with the present invention, the screw channel includes one or more magnets which serve to hold the delivered screw in place upon screw channel 72.

In FIG. 7B(i) and FIG. 7B(ii), screw insertion is initiated as insertion rod 70 and screw channel 72 advance in unison toward screw pocket 32 and screw bore 33. FIG. 7C(i) and FIG. 7C(ii) show continued screw insertion as insertion rod 70 and screw channel 72 continue to advance in unison as the tip of the delivered screw enters screw bore 33.

Screw insertion continues as screw channel 72 contacts the back wall of screw pocket 32, as shown in FIG. 7D(i) and FIG. 7D(ii), and insertion rod continues to advance fully inserting the screw into screw bore 33, as shown in FIG. 7E(i) and FIG. 7E(ii).

At this time, as shown in FIG. 7F(i) and FIG. 7F(ii), a subsequent or "next" screw is delivered for subsequent insertion during the next cycle. The next screw is delivered from the screw supply through screw tube 61 via a blast of air or other suitable means. The forward motion of the next screw is arrested by stop block 63 as the head of the screw abuts against shoulders 67 of the stop block, as shown in FIG. 7G(i) and FIG. 7G(ii).

Similarly, and primarily under the force of gravity, the next delivered screw falls from slot 65 of stop block 63 downwardly resting upon an upper surface of insertion rod 70, as shown in FIG. 7H(i) and FIG. 7H(ii). And completing the delivery/insertion subcycle, insertion rod 70 is fully retracted, and the next delivered screw falls downwardly into screw channel 72 as it fully retracts, as shown in FIG. 7I(i) and FIG. 7I(ii).

With reference to FIG. 7G(ii), FIG. 7H(ii) and FIG. 7I(ii), it should be noted insertion rod 70 extends at an upward angle such that the tip of the delivered screw contacts the insertion rod first, thereby gently "breaking the fall" of the screw upon the insertion rod, thereby, facilitating proper alignment and reducing undesired misalignment which may lead to jamming or other ill effects. Preferably, the insertion rod extends with respect to horizontal (and/or the screw tube) at an angle of approximately 10° to 20°, and more preferably approximately 15°.

As noted above, stop block 63 may include under laminations positioned below screw tube plate 60 in order to provide further guidance as the screw falls downwardly to screw channel 72.

For convenience in explanation and accurate definition in the appended claims, the terms "front" or "rear", "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pocket-cutting and screw-insertion system for cutting screw pockets in a work piece and inserting screws therein, the system comprising:
    a clamp assembly for securing a work piece to a work top;
    a router assembly arranged to rout a screw pocket in the work piece;
    a drill assembly arranged to drill a screw bore extending from an edge of the work piece to the screw pocket; and
    a delivery and insertion assembly including a screw delivery tube for delivering a screw from a screw supply, a stop block for arresting forward motion of the screw from the screw delivery tube, an insertion rod for pushing the screw into the screw pocket and screw bore, and a screw channel for supporting the screw as it is inserted into the screw pocket and screw bore;
    wherein the stop block is positioned above the insertion rod and the screw channel such that the screw first falls from the stop block onto the insertion rod once the stop block arrests forward motion of the screw and then falls from the insertion rod onto the screw channel as the insertion rod retracts.

2. A system according to claim 1, wherein the screw delivery tube extends substantially horizontally.

3. A system according to claim 1, the delivery and insertion assembly further comprising a removable screw tube plate supporting the screw tube and the stop block, wherein the stop block is formed of laminations mounted on a screw tube plate.

4. A system according to claim 3, wherein the stop block further includes under laminations positioned on a bottom surface of the screw tube plate.

5. A system according to claim 1, the delivery and insertion assembly further comprising a first actuator to reciprocate the insertion rod between retracted and extended positions, and a second actuator to reciprocate the screw channel between retracted and extended positions.

6. A system according to claim 5, wherein the first and second actuators are pneumatic actuators.

7. A system according to claim 5, wherein the system is configured so that first actuator retracts the insertion rod before the second actuator retracts the screw channel thereby allowing the delivered screw to fall from the insertion rod onto the screw channel.

8. A pocket-cutting and screw-insertion system for cutting screw pockets in a work piece and inserting screws therein, the system comprising:
    a clamp assembly for securing a work piece to a work top;
    a router assembly arranged to rout a screw pocket in the work piece;
    a drill assembly arranged to drill a screw bore extending from an edge of the work piece to the screw pocket; and
    a delivery and insertion assembly including a screw delivery tube for delivering a screw from a screw supply, a stop block for arresting forward motion of the screw from the screw delivery tube, an insertion rod for pushing the screw into the screw pocket and screw bore, and a screw channel for supporting the screw as it is inserted into the screw pocket and screw bore;
    wherein the stop block is positioned above the insertion rod and the screw channel such that the screw first falls from the stop block onto the insertion rod once the stop block arrests forward motion of the screw and then falls from the insertion rod onto the screw channel as the insertion rod retracts; and
    wherein the stop block includes a longitudinal slot dimensioned and configured to loosely receive the screw and a shoulder dimensioned and configured to contact against a head of the screw to arrest forward motion of the screw within the stop block.

9. A pocket-cutting and screw-insertion method for cutting screw pockets in a work piece and inserting screws therein, the method comprising:
    securing a work piece to a work top;
    routing a screw pocket in the work piece;
    drilling a screw bore extending from an edge of the work piece to the screw pocket;
    delivering a screw from a screw supply to a delivery and insertion assembly, wherein forward motion of the screw is arrested by a stop block mounted on the delivery and insertion assembly and the screw is allowed to fall from the stop block onto an insertion rod, and wherein the insertion rod retracts thereby allowing the screw to fall from the insertion rod onto a screw channel; and
    inserting the screw into the screw pocket such that a tip of the screw extends into the screw bore, wherein the insertion rod pushes the screw into the screw pocket as the screw channel supports the screw.

10. A method according to claim 9, wherein the forward motion of the screw is substantially horizontal motion.

11. A method according to claim 9, wherein the stop block includes a longitudinal slot dimensioned and configured to loosely receive the screw and a shoulder dimensioned and configured to contact against a head of the screw to arrest forward motion of the screw within the stop block.

12. A method according to claim 9, wherein a first actuator reciprocates the insertion rod between retracted and extended positions and a second actuator reciprocate the screw channel between retracted and extended positions.

13. A method according to claim 12, wherein the first and second actuators are pneumatically actuated.

14. A method according to claim 12, wherein the first actuator retracts the insertion rod before the second actuator retracts the screw channel thereby allowing the screw to fall from the insertion rod onto the screw channel prior to insertion.

* * * * *